United States Patent [19]

Juett et al.

[11] 4,290,408
[45] Sep. 22, 1981

[54] REFRACTORY LATTICE AND FABRICATION

[75] Inventors: George C. Juett, Pasadena; Donald H. Rez, 301 36th St., Newport Beach, Calif. 92663

[73] Assignees: Donald H. Rez; Betty Rez, both of Newport Beach, Calif.

[21] Appl. No.: 5,306

[22] Filed: Jan. 22, 1979

[51] Int. Cl.³ .................. A47J 37/00; F23H 13/00; C04B 33/34; A01J 43/20
[52] U.S. Cl. ......................... 126/25 R; 126/152 B; 249/117; 264/60
[58] Field of Search ............... 126/25, 142, 143, 144, 126/152; 264/60; 249/117; 431/326

[56] References Cited

U.S. PATENT DOCUMENTS

| | | | |
|---|---|---|---|
| 236,647 | 1/1881 | Sweeney | 249/117 |
| 495,872 | 4/1893 | Ball | 249/117 |
| 2,135,342 | 11/1938 | Jackson | 249/117 |
| 2,907,129 | 10/1959 | Bedell | 264/60 |
| 3,220,856 | 11/1965 | Vischer, Jr. | 249/117 |
| 3,375,816 | 4/1968 | Chesnut, Jr. | 126/25 R |
| 3,618,181 | 11/1971 | Veale | 249/117 |
| 3,937,138 | 2/1976 | Tidwell | 126/25 R |
| 4,068,649 | 1/1978 | Johnson | 126/143 |
| 4,165,355 | 8/1979 | Vasilos | 264/60 |

Primary Examiner—Samuel Scott
Assistant Examiner—Wesley S. Ratliff, Jr.
Attorney, Agent, or Firm—William W. Haefliger

[57] ABSTRACT

A refractory lattice for use in cooking above a flame source and below a cooking zone includes:
(a) a series of integrally interconnected refractory bodies forming a generally horizontally extending lattice,
(b) metallic members projecting lengthwise through multiple of said bodies and confined within the lattice to reinforce same,
(c) whereby the bodies will be heated by flames rising from said source to radiate heat upwardly to the cooking zone, and the metallic members will not be directly exposed to said flames.

The bodies are typically arranged in regular pattern over the lattice, and openings are formed at regular intervals over the lattice, and between the bodies.

6 Claims, 7 Drawing Figures

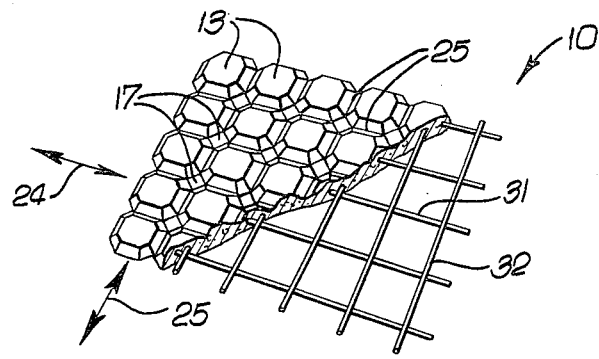
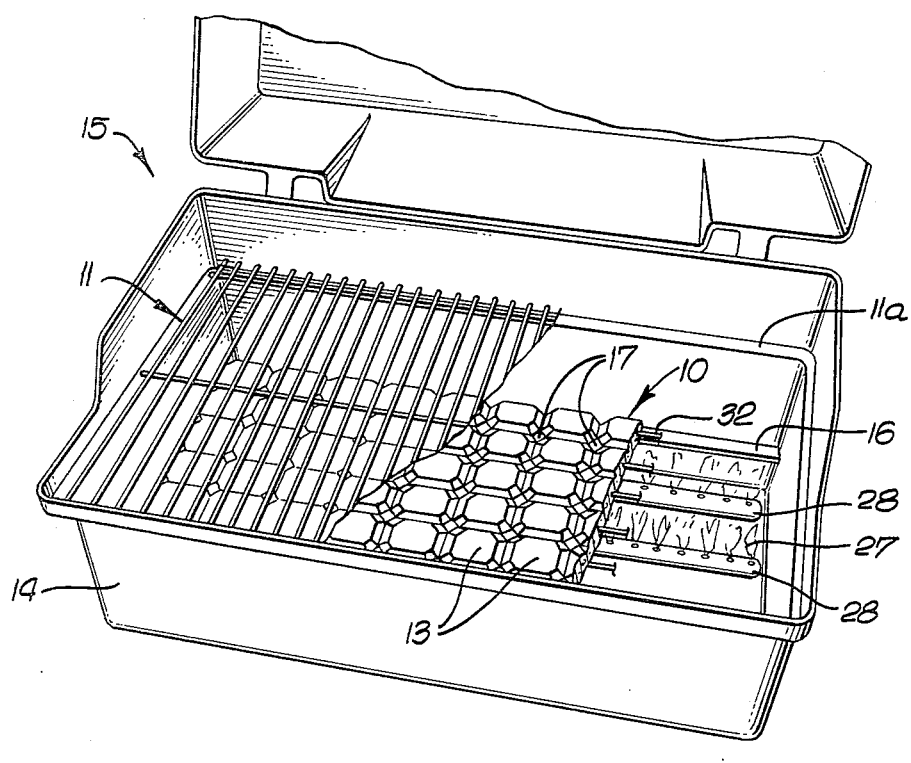
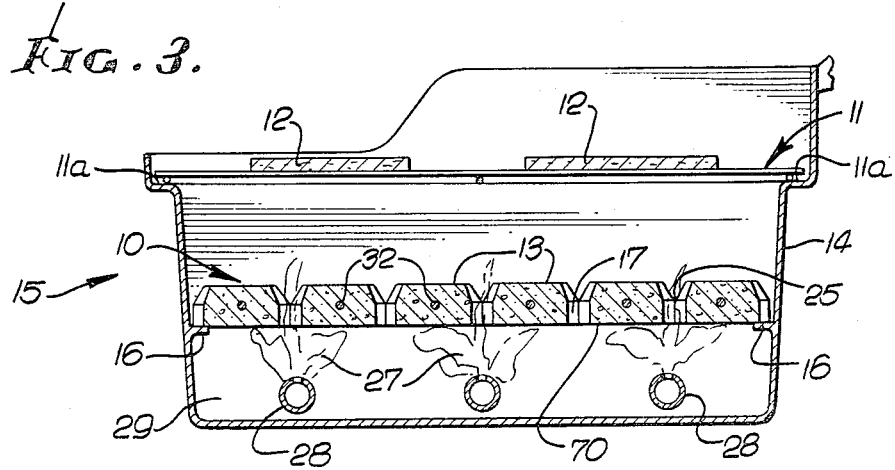

U.S. Patent  Sep. 22, 1981  Sheet 2 of 2  4,290,408
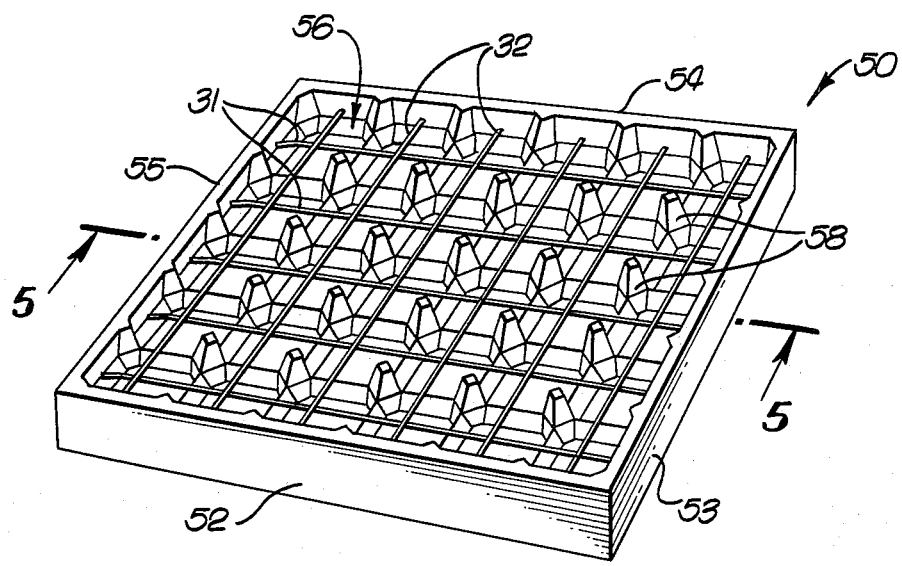
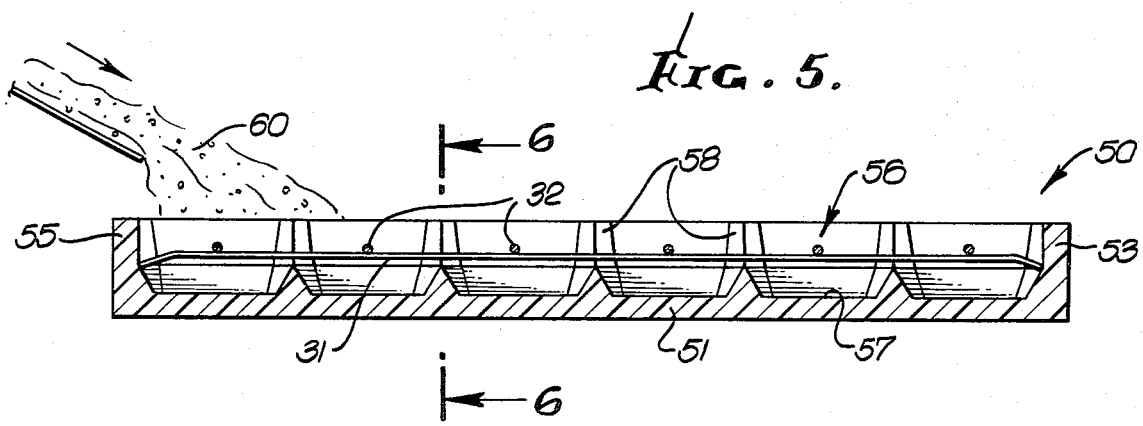
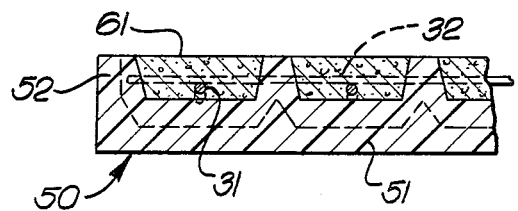
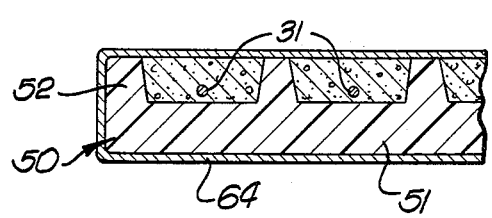

REFRACTORY LATTICE AND FABRICATION

BACKGROUND OF THE INVENTION

This invention relates generally to cooking apparatus, and more specifically concerns improvements in the efficiency of barbecue equipment wherein artificial briquettes are used.

In the past, the expense of charcoal briquettes has resulted in the substitution of ceramic briquettes or lava rocks. These are commonly piled on top of one another to form a bed supported on a grid above a flame source. The latter may for example include gas burners from which flames rise to heat the bed. Disadvantages and problems include the height of the briquette bed which adds to the height of the cooking apparatus; the deterioration of the bottom grate which supports the bed due to direct flame contact with the metal, rusting and corrosion; and the relatively high expense of the briquettes or lava rocks plus that of the heavy bottom grate. No way was known, prior to the present invention, to eliminate these problems, and particularly in the novel and surprisingly efficient and simple manner as is now afforded by the present application.

SUMMARY OF THE INVENTION

Basically, and fundamentally, the invention involves elimination of need for the bottom grate through consolidation of the individual artificial briquettes into an integrated refractory lattice capable of self-support in the housing or shell of the barbeque equipment. The lattice comprises:

(a) a refractory lattice to be supported in a barbeque shell to extend above the shell lower interior and below an upper grille location, (b) the lattice comprising a series of integrally interconnected refractory bodies in a generally horizontally extending plane and adapted to be heated by underlying flames and to radiate heat upwardly toward edibles on the cooking grille, there being openings formed vertically through the lattice.

As will be seen, the lattice may be reinforced by provision of metallic members projecting lengthwise through multiple of the refractory bodies and confined within the lattice so as not to be directly exposed to flame and corrosive fluids dripping from meat or other edibles, whereby corrosion of the reinforcement members is eliminated. Also, the overall height of the refractory briquette unit is substantially reduced as compared with the height of a bed of individual briquettes piled on a bottom grate.

Further, the bodies in the lattice may be arranged in rows and columns to facilitate their reinforcement as well as the location of the gas passing openings through the lattice at the corners between the bodies; and the resultant lattice may readily be placed into and supported in a barbecue shell or grid, and easily removed for cleaning.

It is another object of the invention to provide a method of forming the lattice using a mold which may be packaged with the set of refractory lattice remaining in the mold, the package be shippable and the mold being easily removable from the lattice by the end user.

As will appear, the refractory lattice enhances barbecue smoke flavoring of meat on an overlying grille, through even heating of the lattice to more completely vaporize grease drippings; it provides control of grease flare-ups; and it reduces cooking time as compared with prior artificial briquette installations, and thereby conserves fuel such as L. P. gas; and it is virtually self-cleaning through efficient grease vaporizing operation.

These and other objects and advantages of the invention, as well as the details of an illustrative embodiment, will be more fully understood from the following description and drawings in which:

DRAWING DESCRIPTION

FIG. 1 is a perspective showing of a refractory lattice embodying the invention;

FIG. 2 is a perspective showing of a cooking unit employing the invention;

FIG. 3 is a vertical section through a cooking unit employing the invention;

FIG. 4 is a perspective showing of a mold used in forming the refractory lattice;

FIG. 5 is a vertical section through the FIG. 5 mold;

FIG. 6 is a fragmentary view of the FIG. 5 mold after the refractory material has been poured into place; and FIG. 7 is a view like FIG. 6, but showing the mold and set refractory material packaged for shipment.

DETAILED DESCRIPTION

Referring first to FIG. 1, one form of refractory lattice 10 constructed in accordance with the invention is usable above a flame source and below a cooking zone. As will appear, the lattice is adapted to be heated by underlying flames, and to radiate heat upwardly to the cooking zone such as may be formed by a grille seen at 11 in FIGS. 2 and 3. Steaks or other meat are shown at 12 in FIG. 3, on the open work grille. Other types of cooking zones may be used.

As shown in FIG. 1, the lattice 10 is comprised of a series of integrally interconnected refractory bodies 13 forming the lattice which in use is adapted to extend generally horizontally. Thus, the lattice comprises a one-piece unit which may be easily placed into the shell or housing 14 of the cooking unit 15 and suitably edge supported, as by ledges 16 seen in FIG. 3 as associated with the shell. Grille 11 may be supported by the shell, as at 11a. Bottom 70 of the lattice is flat.

Openings are formed through the one-piece lattice, as for example are indicated at 17 in FIGS. 1-3. Such openings are adapted to pass hot gases and some flames upwardly through the lattice for escape of the gases and also to optimize heating of the refractory lattice to enable efficient upward radiation of heat thereby to the cooking zone. For this purpose, the bodies 23 are preferably arranged in rows and columns as seen in FIG. 1, arrows 24 indicating the direction of rows, and arrows 25 indicating the directions of columns. The openings 17 may then be efficiently spaced in regular row and column pattern over the area of the lattice, and at reduced thickness junctions 25 between the bodies 13. Such junctions also extend in row and column pattern, and if the bodies have generally rectangular or square outline as shown, the openings 17 may be efficiently formed at junction corners between the bodies, i.e. between diagonally related bodies.

FIGS. 2 and 3 also show flames 27 rising from gas burners 28 extending in a zone 29 below the lattice.

FIG. 1 also shows the provision of metallic members 31 and 32 projecting lengthwise through multiple of the bodies 13, and confined within the lattice to reinforce same. Such members may consist of heavy wire or narrow metallic bars, arranged in a grid or mesh pattern, with members 31 and 32 respectively extending in row and column directions, as related to the bodies 13. The members 31 and 32 do not intersect openings 17, whereby they are confined against direct exposure to hot flames and gases, to prevent their corrosion. This eliminates the problem of corrosion of the metal grid that supports multiple disconnected refractory bodies in prior cooking units. Also, the height of the cooking unit is enabled to be reduced through use of the refractory lattice of the present invention.

Regarding fabrication of the lattice 10, FIG. 4 shows the provision of a mold 50 of generally rectangular outline, and having a bottom wall 51 and four side walls 52–55. A downward recess is sunk in the mold at 56, the mold surface 57 at the bottom of the recess having the waffled, or upwardly protruding, spaced regular surface pattern of the lattice bodies 13 shown in FIG. 1. The mold may consist of lightweight plastic material such as styrofoam, to be of low cost and "wasted", i.e. broken away from the product, as by the user.

A series of upwardly tapering cores 58 in the form of pillars are upstanding from surface 57, as best seen in FIG. 6, and at the locations of openings 17 in the ceramic lattice to be molded. The cores may be integral with the mold 50, or retained therein. The reinforcing mesh or members 31 and 32 are also placed in the recess as seen in FIGS. 4 and 5 to be supported by the mold structure. Thereafter, an aqueous slurry of the refractory material is introduced into mold, as indicated at 60 in FIG. 5. The slurry fills up to the level indicated at 61 in FIG. 6 (corresponding to lattice bottom 70), and sets, the bars 31 and 32 being embedded in the refractory material. Preferably, the mold and mix are vibrated immediately after filling of mix into the mold.

The mold and contained lattice may be packaged as seen at 64 in FIG. 7, and shipped, as is, and the user may then peel away the package, break off the mold, and remove the cores, to expose the lattice, for use. The mold protects the product, as shipped. Alternatively the mold may consist of rubber or other elastomeric material, and re-used.

One example of a usable refractory mix is a slurry containing approximately:

94 lbs. of cement (concrete forming)
290 lbs. of pre-fired or calcined graded aggregate (sand, small rock or other)
6 gallons of water.

Other mixes are also usable.

We claim:

1. In combination with an upper grille to support an edible, and a flame source spaced below the grille, the grille supported by a shell, the improvement comprising
    (a) a series of integrally interconnected refractory briquettes forming a generally horizontally extending lattice spaced below the grille and above said flame source.
    (b) metallic members projecting lengthwise through multiple of said briquettes and confined within the lattice to reinforce same, said members protected against direct flame contact by extents of said refractory briquettes therebeneath,
    (c) whereby the briquettes will be heated by flames rising from said source to radiate heat upwardly to the cooking zone, and the metallic members will not be directly exposed to said flames,
    (d) said briquettes being arranged in rows and columns, and there being vertical openings formed through the lattice, between diagonally related briquettes, said openings also spaced apart in rows and columns.

2. The refractory lattice of claim 1 wherein said briquettes are interconnected at reduced thickness junctions below upwardly diverging grooves which extend in the directions of said rows and columns.

3. The refractory lattice of claim 2 wherein said members extend in the directions of said rows and columns and form a grid within the briquettes.

4. The refractory lattice of claim 1 wherein said briquettes form a one-piece unitary lattice.

5. The improvement of claim 1 including a lightweight plastic mold extending protectively under the lattice and at the sides thereof, there being mold cores extending upwardly through said openings and projecting from levels below said metallic members to levels above said members, said cores everywhere spaced from said members.

6. The combination of claim 5 including a package about the mold and lattice.

* * * * *